United States Patent
Fefermann et al.

(10) Patent No.: US 12,378,933 B2
(45) Date of Patent: Aug. 5, 2025

(54) SYSTEM FOR CONVERTING AND TRANSPORTING ELECTRICAL ENERGY FOR THE INTERNAL HYBRIDISATION OF AN AIRCRAFT TURBOMACHINE

(71) Applicants: Safran, Paris (FR); Safran Aircraft Engines, Paris (FR); Safran Electrical & Power, Blagnac (FR)

(72) Inventors: Yann Fefermann, Moissy-Cramayel (FR); Pierre-Alain Jean Philippe Reigner, Moissy-Cramayel (FR); Philippe Naneix, Moissy-Cramayel (FR); Philippe Delbosc, Moissy-Cramayel (FR)

(73) Assignees: Safran, Paris (FR); Safran Aircraft Engines, Paris (FR); Safran Electrical & Power, Blagnac (FR)

(*) Notice: Subject to any disclaimer, the term of this patent is extended or adjusted under 35 U.S.C. 154(b) by 0 days.

(21) Appl. No.: 18/712,667

(22) PCT Filed: Oct. 26, 2022

(86) PCT No.: PCT/EP2022/079979
§ 371 (c)(1),
(2) Date: May 22, 2024

(87) PCT Pub. No.: WO2023/094101
PCT Pub. Date: Jun. 1, 2023

(65) Prior Publication Data
US 2025/0012201 A1    Jan. 9, 2025

(30) Foreign Application Priority Data
Nov. 25, 2021  (FR) .................................... 2112486

(51) Int. Cl.
*F01D 15/10* (2006.01)
*B64D 27/33* (2024.01)
(Continued)

(52) U.S. Cl.
CPC ............. *F01D 15/10* (2013.01); *B64D 27/33* (2024.01); *B64D 27/357* (2024.01); *B64D 31/18* (2024.01); *F05D 2220/76* (2013.01)

(58) Field of Classification Search
CPC ..... F01D 15/10; F01D 2220/76; B64D 27/33; B64D 27/357; B64D 31/18
See application file for complete search history.

(56) References Cited

U.S. PATENT DOCUMENTS 9,260,195 B2 *  2/2016  Oyori ...................... F01D 15/10
9,366,182 B2 *  6/2016  Rodriguez ................ F02C 6/18
(Continued)

FOREIGN PATENT DOCUMENTS

EP    3693571 A1    8/2020
EP    3832096 A1    6/2021
(Continued)

OTHER PUBLICATIONS

International Patent Application No. PCT/EP2022/079979, International Search Report and Written Opinion, dated Dec. 22, 2022.
(Continued)

*Primary Examiner* — Pedro J Cuevas
(74) *Attorney, Agent, or Firm* — Kilpatrick Townsend & Stockton LLP

(57) ABSTRACT

The present invention relates to a system for converting and transporting electrical energy in a turbomachine-propelled aircraft, said system including:
at least a first rotary electric machine connected mechanically to the low-pressure shaft by means of a coupling device, (Continued)

a second rotary electric machine connected mechanically to the high-pressure shaft by means of an accessory gearbox, and said first electric power module and said second electric power module being connected electrically to an internal electrical network of the turbomachine, a generator coupled to the accessory gearbox and intended to supply an electrical network of the aircraft with electricity, and a control device for controlling start-up of the turbomachine by at least one rotary electric machine, for compensating for power consumed by the generator, and for implementing distribution between the power absorbed by the high-pressure shaft and the power absorbed by the low-pressure shaft.

12 Claims, 5 Drawing Sheets

(51) Int. Cl.
  *B64D 27/357* (2024.01)
  *B64D 31/18* (2024.01)

(56) References Cited

U.S. PATENT DOCUMENTS

| | | | | |
|---|---|---|---|---|
| 9,570,958 | B2* | 2/2017 | Wilson | F01D 25/08 |
| 9,586,690 | B2* | 3/2017 | Rajashekara | F01D 15/10 |
| 9,593,591 | B2* | 3/2017 | Phillips | G07C 5/0808 |
| 9,853,335 | B2* | 12/2017 | Blackwelder | H01M 10/6557 |
| 10,436,122 | B2* | 10/2019 | Cline | F02C 7/32 |
| 10,583,931 | B2* | 3/2020 | Cline | F02C 6/14 |
| 11,022,042 | B2* | 6/2021 | Munevar | F02C 7/36 |
| 11,639,690 | B1* | 5/2023 | Kupratis | F02C 7/32 60/773 |
| 12,027,871 | B2* | 7/2024 | Bradier | B64D 41/00 |
| 12,034,306 | B1* | 7/2024 | Matheson | B64D 27/24 |
| 12,097,965 | B2* | 9/2024 | Delbosc | B64D 27/33 |
| 2015/0100180 | A1* | 4/2015 | Oyori | F01D 15/10 701/3 |
| 2015/0159552 | A1* | 6/2015 | Rodriguez | F02C 7/32 290/2 |
| 2015/0180100 | A1* | 6/2015 | Blackwelder | F25D 17/02 62/64 |
| 2015/0191252 | A1* | 7/2015 | Cline | F02C 9/00 60/39.24 |
| 2015/0288253 | A1* | 10/2015 | Wilson | H02K 9/04 290/1 B |
| 2015/0367950 | A1* | 12/2015 | Rajashekara | B64D 31/06 903/930 |
| 2015/0369138 | A1* | 12/2015 | Phillips | F01D 21/00 701/100 |
| 2016/0010567 | A1* | 1/2016 | Cline | F23R 3/26 60/722 |
| 2016/0319745 | A1* | 11/2016 | Zeller | F01D 25/18 |
| 2017/0044989 | A1* | 2/2017 | Gemin | F02C 7/32 |
| 2017/0226934 | A1 | 8/2017 | Robic et al. | |
| 2021/0025334 | A1 | 1/2021 | De Wergifosse et al. | |
| 2021/0262398 | A1* | 8/2021 | Gemin | F02C 7/268 |
| 2022/0411082 | A1* | 12/2022 | Delbosc | H02J 4/00 |
| 2023/0114737 | A1* | 4/2023 | Bradier | B64D 41/00 244/60 |
| 2024/0291280 | A1* | 8/2024 | Naneix | H02J 3/381 |
| 2024/0326609 | A1* | 10/2024 | Hadjidj | B64D 27/026 |
| 2024/0383610 | A1* | 11/2024 | Viguier | B64D 27/33 |

FOREIGN PATENT DOCUMENTS

| | | | |
|---|---|---|---|
| WO | 2020089544 | A1 | 5/2020 |
| WO | 2021099720 | A1 | 5/2021 |

OTHER PUBLICATIONS

International Application No. PCT/EP2022/079979, International Preliminary Report on Patentability mailed on Jun. 6, 2024, 13 pages (8 pages of Original Document and 5 pages of English Translation).

* cited by examiner

[Fig. 1]
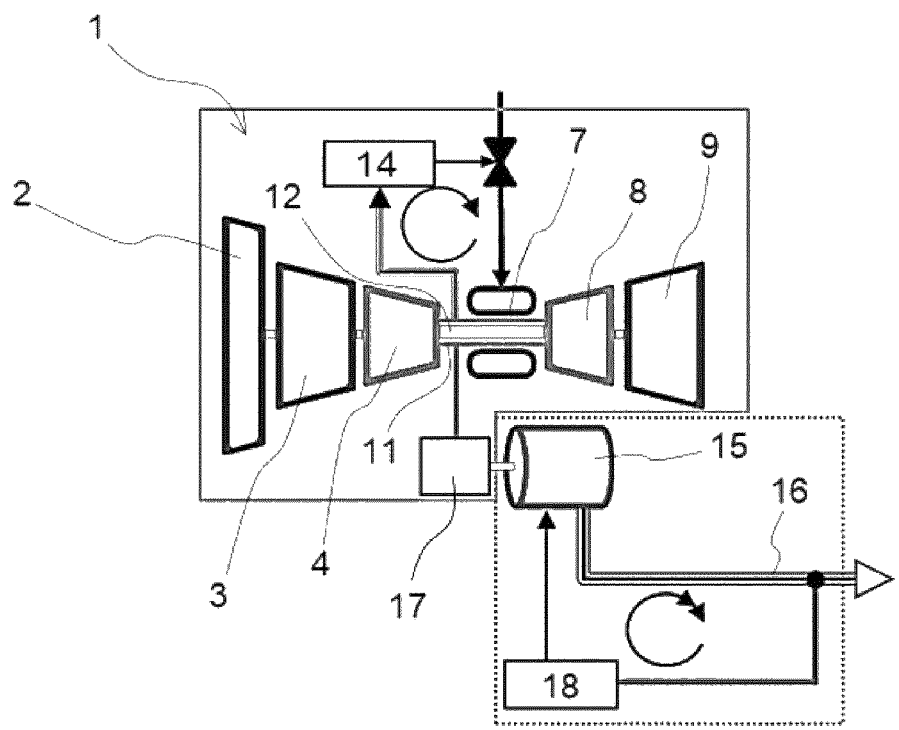
[Fig. 2]
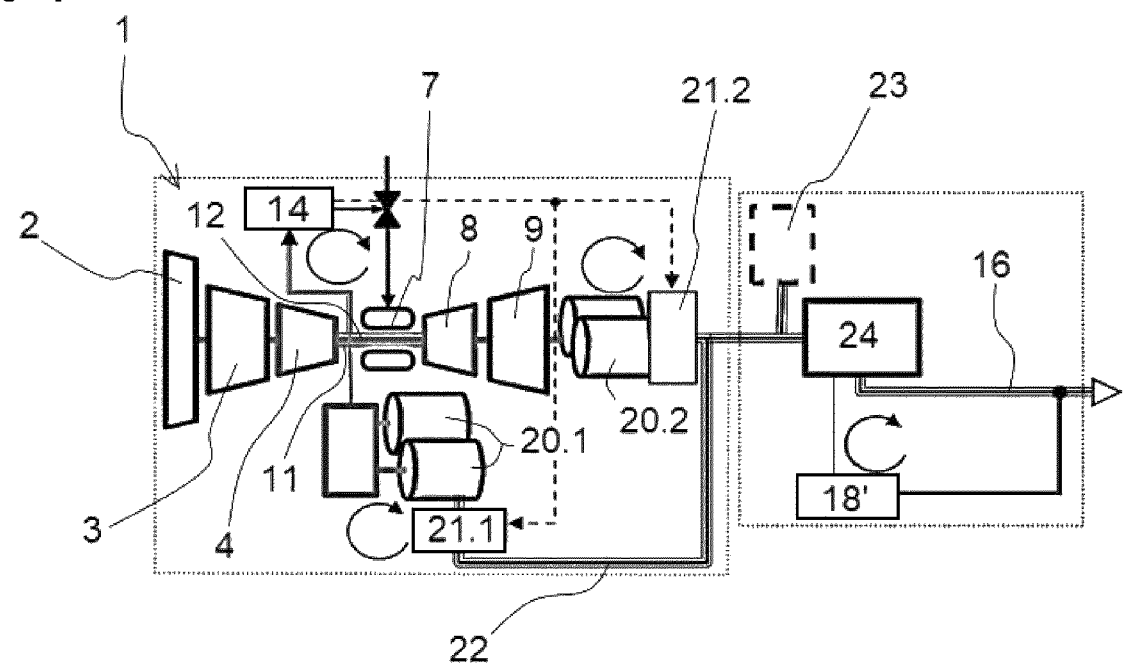

[Fig. 3]
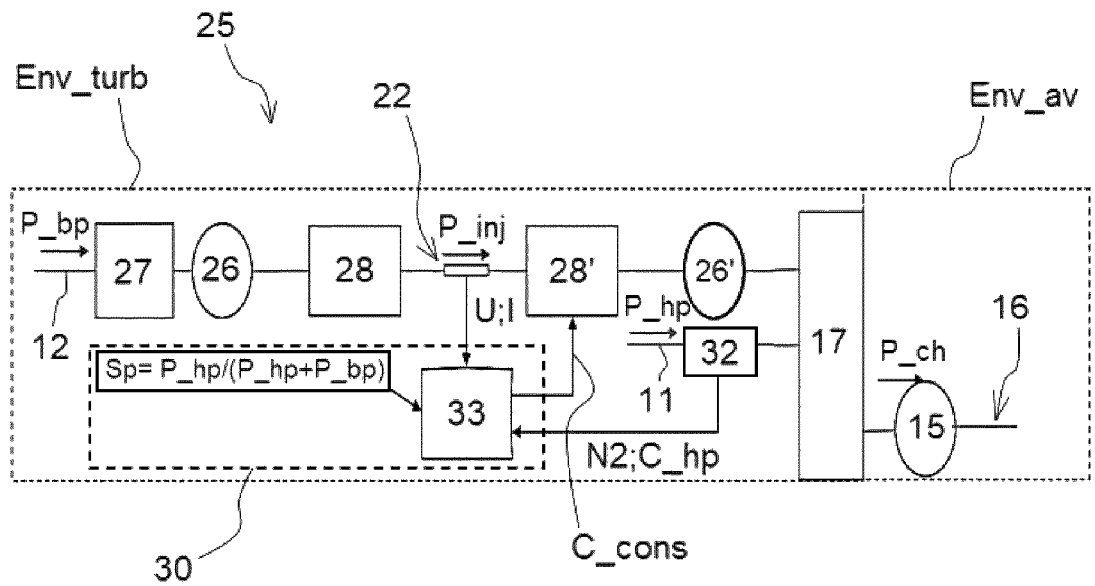
[Fig. 4]
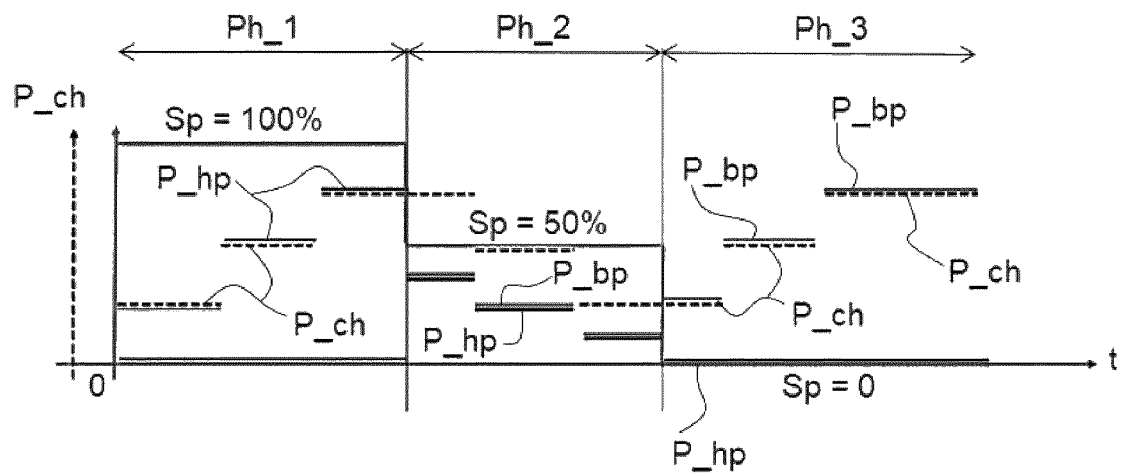

[Fig. 5]
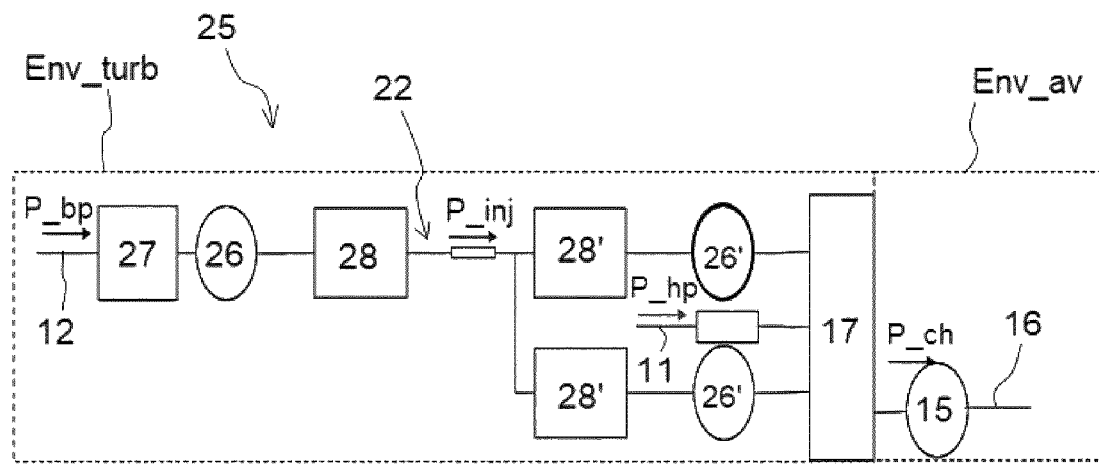
[Fig. 6]
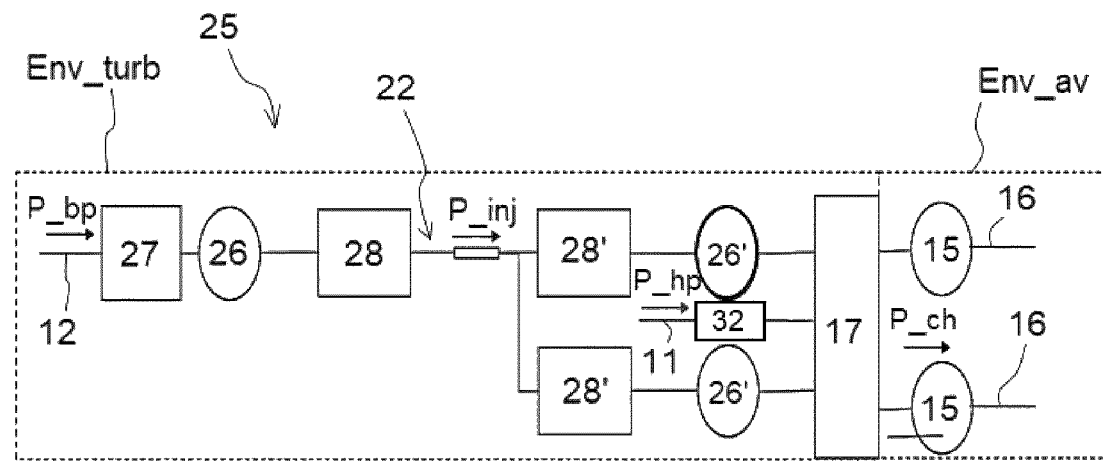

[Fig. 7]
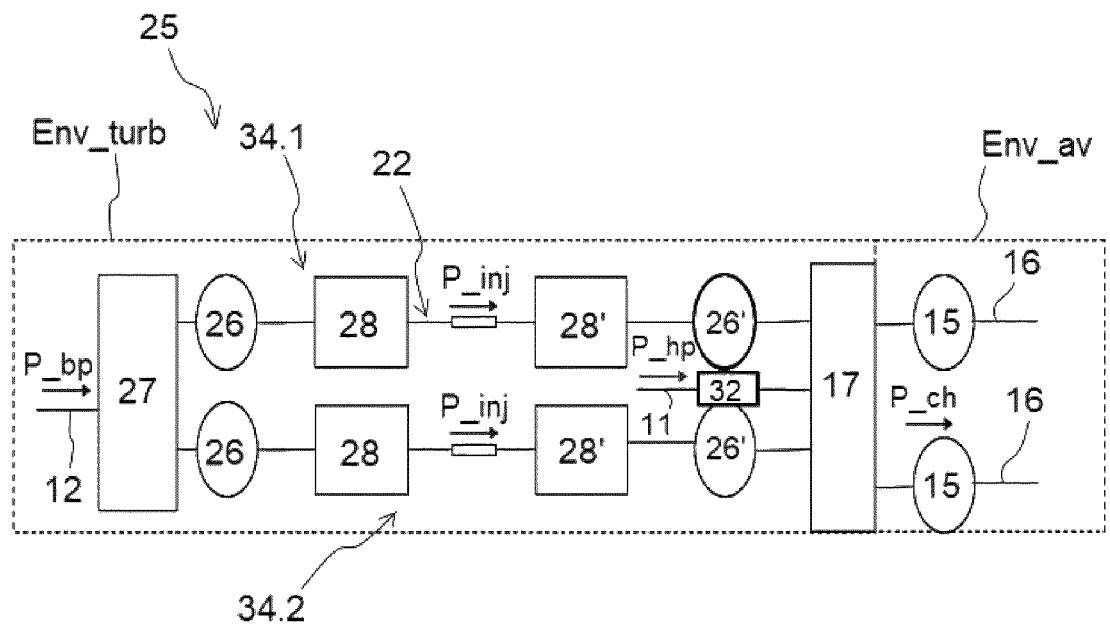
[Fig. 8]
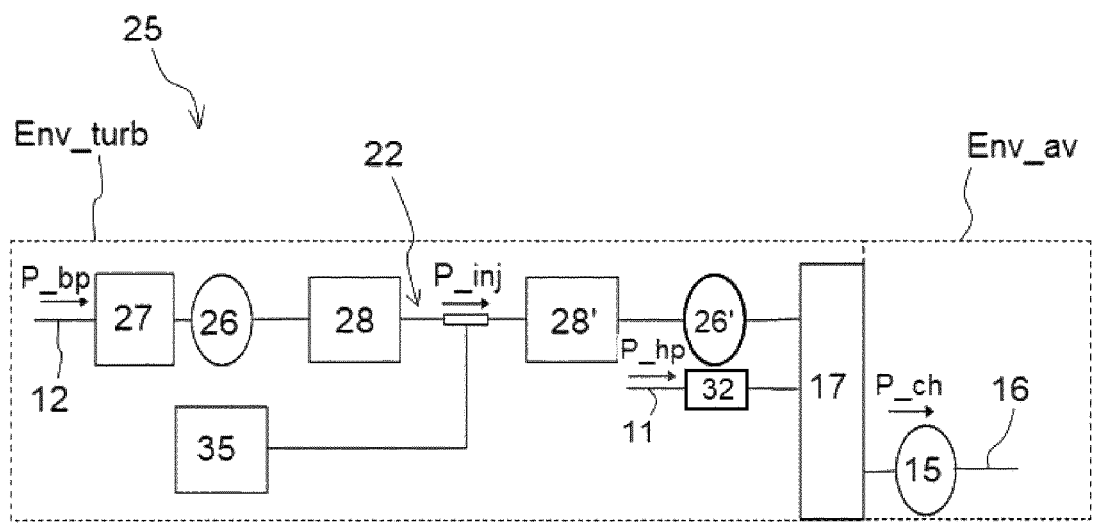

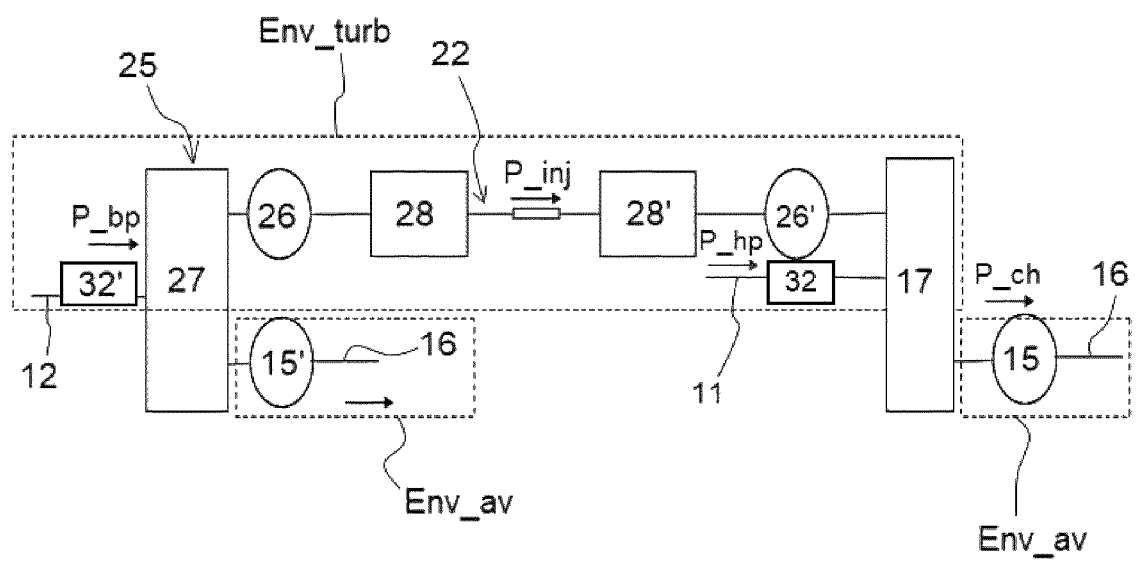
[Fig. 9]

SYSTEM FOR CONVERTING AND TRANSPORTING ELECTRICAL ENERGY FOR THE INTERNAL HYBRIDISATION OF AN AIRCRAFT TURBOMACHINE

The present invention relates to an electrical energy conversion and transport system for the internal hybridization of an aircraft turbo-engine. The invention finds a particularly advantageous application with hybrid propulsion architectures for civil or military aircrafts.

As illustrated in FIG. 1, a turbo-engine 1 conventionally comprises a fan 2, one or more stages of compressors, for example a low-pressure compressor 3 and a high-pressure compressor 4, a combustion chamber 7, one or more stages of turbines, for example a high-pressure turbine 8 and a low-pressure turbine 9, and a gas exhaust nozzle (not shown). Typically, the high-pressure turbine 8 rotates the high-pressure compressor 4 via a first shaft, so-called high-pressure shaft 11, while the low-pressure turbine 9 rotates the low-pressure compressor 3 and the fan 2 to rotate via a second shaft, so-called low-pressure shaft 12. The low-pressure shaft 12 is generally housed in the high-pressure shaft 11. An engine control device 14 of the FADEC type (Full Authority Digital Engine Control) allows to monitor and control the state of the components of the turbo-engine 1 and to adjust the various parameters in order to optimize the performance of the turbo-engine 1.

In order to ensure the supply of the electrical network of the aircraft in this type of non-hybrid architecture, at least one generator 15 is connected to the high-pressure shaft 11 via a accessories box 7 or AGB (accessory gearbox). This accessory box 17 generally comprises one or more gear trains which are rotated by mechanical drawing by means of an angle transmission device on the high-pressure shaft 11. The generator(s) 15 can thus electrically power all the electrical loads connected to the electrical network of the aircraft 16, such as flight control systems, de-icing systems, fans, etc.

A control unit 18, so-called GCU (Generator Control Unit), supervises the operation of the generator 15 in question by ensuring in particular a voltage regulation and operating diagnostics.

Such an architecture has the advantage of decoupling the propulsion mechanics part in relation to the electrical network of the aircraft 16. The power available on the side of the electrical network of the aircraft 16 is also controlled whatever the speed of the turbo-engine 1.

In the context of a hybrid architecture of turbo-engine 1, it is possible to implement electrical channels DC connected in parallel as described for example in documents WO2020/089544 or WO2021/099720. An internal hybridization of the turbo-engine 1 applying these principles is illustrated in FIG. 2. A first channel DC is formed by at least one electrical rotating machine 20.1 mechanically connected to the high-pressure shaft 11. This electrical machine 20.1 is associated with a converter AC/DC 21.1. A second channel DC is formed by at least one electrical rotating machine 20.2 mechanically connected to the low-pressure shaft 12. This electrical machine 20.2 is associated with an AC/DC converter 21.2. The converters 21.1, 21.2 are electrically connected to an internal electrical network 22 of the turbo-engine 1. An electrical converter 24 controlled by a controller 18' provides the interface between the internal electrical network 22 of the turbo-engine 1 and the electrical network of the aircraft 16. At least one electrical energy storage subassembly 23, such as for example a battery or supercapacitors, can if necessary be connected to the internal electrical network 22.

Such an architecture makes it possible to ensure a start-up function for the turbo-engine 1 via electrical power supplied by the electrical machines 20.1, 20.2. This architecture also provides the turbo-engine 1 with an assistance function according to which the electrical network injects or draws power into/from the high-pressure shaft 11 or the low-pressure shaft 12 according to a reference imposed by the engine control device 14.

Due to the electrical coupling between the internal electrical network 22 of the turbo-engine 1 and the electrical network of the aircraft 16, a problem of quality of the electrical network 22 on the side of the turbo-engine 1, such as for example the appearance of harmonic pollution, has repercussions on the side of the electrical network of the aircraft 16, and vice versa.

The invention aims in particular to remedy this drawback effectively by proposing a system for converting and transporting electrical energy in an aircraft powered by a turbo-engine from which power can be drawn or injected via a high-pressure shaft and/or a low-pressure shaft, said system comprises:
  at least one first electrical rotating machine mechanically connected to the low-pressure shaft via a coupling device,
  a first electrical power module associated with said first electrical machine,
  a second electrical rotating machine mechanically connected to the high-pressure shaft via an accessory box, and
  a second electrical power module associated with said second electrical rotating machine,
  said first electrical power module and said second electrical power module being electrically connected to an internal electrical network of the turbo-engine,
  a generator coupled with the accessories box and intended to electrically supply an electrical network of the aircraft, and
  a control device able to control an assistance for starting the turbo-engine by at least one electrical rotating machine, to compensate for power drawings by the generator, and to carry out a distribution between a power drawn from the high-pressure shaft and from the low-pressure shaft as a function of the operating phases of the turbo-engine.

The invention thus permits to separate the internal electrical network from the turbo-engine in relation to the electrical network of the aircraft, to the extent that the generator allows to power the systems connected to the on-board electrical network independently of the engine hybridization system.

The invention also permits to maintain independence between the propulsion part and the aircraft by performing no measurement on the electrical drawing from the aircraft part managed by the aircraft manufacturer.

The invention also proposes a safe architecture by imposing an open loop operation in the event of a malfunction of the hybridization system.

According to one embodiment of the invention, the control device is configured to modify a power distribution coefficient Sp as a function of operating phases of the turbo-engine, said power distribution coefficient Sp being defined as follows:

$$Sp = P\_hp/(P\_hp + P\_bp)$$

P_hp being a portion of the power of the high-pressure shaft passing through the accessory box, P_bp being a portion of the power of the low-pressure shaft passing through the first electrical rotating machine.

According to one embodiment of the invention, the portion of the power of the high-pressure shaft passing through the accessory box is determined from a rotational speed measurement carried out by a speed sensor mounted on the high-pressure shaft and a torque value of the high-pressure shaft obtained by means of a torque estimator. This torque estimator can be positioned between an angle transmission device and an input to the accessory box. The torque estimator could also be placed on the shaft of the generator or on the shaft of the second electrical machine. It is also possible to use a torque estimator software implementing an algorithm or a dedicated mapping.

According to one embodiment of the invention, the portion of the power of the low-pressure shaft passing through the first electrical rotating machine is determined from a current and a voltage of the internal electrical network of the turbo-engine.

According to one embodiment of the invention, said system comprises two electrical rotating machines mechanically connected to the high-pressure shaft via the accessory box.

According to one embodiment of the invention, said system comprises two electrical rotating machines mechanically connected to the low-pressure shaft.

According to one embodiment of the invention, said system comprises two generators mechanically connected to the accessory box.

According to one embodiment of the invention, said system comprises two electrical channels each formed by two electrical rotating machines and two electrical power modules electrically connected to the internal electrical network of the turbo-engine.

According to one embodiment of the invention, said system comprises at least one electrical energy storage subassembly, such as a battery or supercapacitors, electrically connected to the internal electrical network of the turbo-engine.

According to one embodiment of the invention, said system comprises a generator mechanically connected to the coupling device of the low-pressure shaft, said generator being intended to electrically supply the electrical network of the aircraft.

According to one embodiment of the invention, the generator and the second electrical rotating machine are mounted on the accessory box head to tail relative to each other.

The invention also relates to an aircraft comprising an electrical energy conversion and transport system as previously defined.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, wherein:

FIG. 1, already described, is a schematic representation of a non-hybrid turbo-engine architecture according to the state of the art provided with a generator for powering an electrical network of the aircraft;

FIG. 2, already described, is a schematic representation of a hybrid turbo-engine architecture provided with an interface between an internal electrical network of the turbo-engine and an electrical network of the aircraft;

FIG. 3 is a schematic representation of a hybrid turbo-engine architecture according to the present invention;

FIG. 4 is a diagram representing, for different values of a power distribution coefficient, power levels drawn from the high-pressure shaft and the low-pressure shaft in order to supply electrical loads connected to a network aircraft electrical;

FIGS. 5 to 9 are schematic representations of alternative embodiments of the hybrid turbo-engine architecture according to the present invention.

It should be noted that the common structural and/or functional elements to the different embodiments have the same references. Thus, unless otherwise stated, such elements have identical structural, dimensional and material properties.

FIG. 3 shows a system 25 for converting and transporting electrical energy in an aircraft powered by a turbo-engine 1 already described with reference to FIG. 1 from which power can be drawn or injected via the high-pressure shaft 11 and/or the low-pressure shaft 12. The rectangle Env_av surrounds the components of the aircraft environment while the rectangle Env_turb surrounds the components of the turbo-engine environment.

The system 25 comprises at least one first electrical rotating machine 26 mechanically connected to the low-pressure shaft 12 via a coupling device 27. The coupling device 27 may, if need be, integrate a mechanical function for uncoupling the electrical machine 26, particularly in the event of malfunction thereof. A first electrical power module 28 is intended to be electrically connected on the one hand to the first electrical machine 26 and on the other hand to an internal electrical network 22 of the turbo-engine 1. The internal electrical network 22 of the turbo-engine 1 is preferably a DC network.

A second electrical rotating machine 26' is mechanically connected to the high-pressure shaft 11 via the accessory box 17. A second electrical power module 28' is electrically connected on the one hand to the second electrical rotating machine 26' and on the other hand to the internal electrical network 22 of the turbo-engine 1. The first electrical power module 28 and the second electrical power module 28' are thus electrically connected to the internal electrical network 22 of the turbo-engine 1.

The electrical rotating machines 26, 26' are preferably electrical machines of reversible type able to operate in a motor mode and in a generator mode. In a motor mode, an electrical rotating machine 26, 26' transforms electrical energy drawn from the internal electrical network 22 into mechanical energy injected into the low-pressure shaft 12 or the high-pressure shaft 11. For this purpose, the electrical power module 28, 28' operates in an inverter mode in order to transform a direct voltage from the internal electrical network 22 into a polyphase alternating voltage applied to the phases of the corresponding electrical machine 26, 26'.

In the generator mode, an electrical rotating machine 26, 26' transforms mechanical energy drawn from the low-pressure shaft 12 or the high-pressure shaft 11 into electrical energy injected into the internal electrical network 22 of the turbo-engine 1. For this purpose, the electrical power module 28, 28' operates in a rectifier mode in order to transform a polyphase alternating voltage generated by the electrical machine 26, 26' into a direct voltage applied to the internal electrical network 22. An electrical power module 28, 28' thus takes the form of an AC/DC converter.

The electrical rotating machines 26, 26' are preferably machines of synchronous type with permanent magnets. Alternatively, the electrical rotating machines 26, 26' could take the form of electrical machines of asynchronous type or any other type of electrical machine adapted to the application.

Furthermore, a generator 15 is coupled with the accessories box 17. The generator 15 is intended to electrically supply an electrical network of the aircraft 16. The generator 15 can take the form of an electrical wound-rotor rotating machine. The generator 15 is electrically isolated from the other electrical rotating machines 26, 26' connected to the internal electrical network 22 of the turbo-engine 1. In other words, the electrical network of the aircraft 16 is electrically isolated from the internal electrical network 22 of the turbo-engine 1. There is no electrical connection between these two electrical networks 16 and 22.

The generator 15 and the second electrical rotating machine 26' are mounted on the accessory box 17 head to tail relative to each other. Such a configuration permits to maximize stiffness and minimize response times. This also allows to adapt the overall size to the application. Alternatively, the generator 15 and the second electrical rotating machine 26' could be mounted on the same side of the accessory box 17.

A control device 30 is able to control an assistance for starting the turbo-engine 1 by at least one electrical rotating machine 26, 26', to compensate for power drawings by the generator 15, and to carry out a distribution between a power drawn from the high-pressure shaft 11 and from the low-pressure shaft 12 as a function of operating phases of the turbo-engine 1.

Advantageously, the control device 30 is configured to modify a power distribution coefficient Sp as a function of the operating phases of the turbo-engine 1 defined as follows:

$$Sp=P\_hp/(P\_hp+P\_bp)$$

P_hp being a portion of the power of the high-pressure shaft 11 passing the accessory box 17, P_bp being a portion of the power P_bp of the low-pressure shaft 12 passing through the first electrical rotating machine 26.

The portion of the power P_hp of the high-pressure shaft 11 passing through the accessory box 17 is determined from a rotational speed measurement N2 carried out by a speed sensor 32 mounted on the high-pressure shaft 11 and a torque value C_hp of the high-pressure shaft 11 obtained by means of a torque estimator. The torque estimator could be an estimator positioned between an angle transmission device and an input of the accessory box 17. The torque estimator could also be placed on the shaft of the generator 15 or on the shaft of the second electrical machine 26'. It is also possible to use a torque estimator software implementing an algorithm or a dedicated mapping.

The portion of the power P_bp of the low-pressure shaft 12 passing by the electrical rotating machine 26 is determined from a current I and a voltage U of the internal electrical network 22.

FIG. 4 illustrates different values of the power distribution coefficient Sp during different operating phases of the turbo-engine 1. During an operating phase Ph_1, the value of the power distribution coefficient Sp is equal to 1 so that all the power P_ch consumed by the electrical loads connected to the electrical network of the aircraft 16 is drawn from the high-pressure shaft 11 via the generator 15. It is then an operating configuration equivalent to that of a non-hybrid architecture.

During an operating phase Ph_2, the value of the power distribution coefficient Sp is 0.5, so that the power P_ch consumed by the electrical loads connected to the electrical network of the aircraft 16 is distributed equitably between a power P_hp drawn from the high-pressure shaft 11 and a power P_bp drawn from the low-pressure shaft 12.

During an operating phase Ph_3, the value of the power distribution coefficient Sp is 0 so that all the power P_ch consumed by the electrical loads connected to the electrical network of the aircraft 16 is drawn from the low-pressure shaft 12.

The power P_bp drawn taken from the low-pressure shaft 12 is transformed into electrical power P_inj on the internal electrical network 22 of the turbo-engine 1 by the electrical machine 26 and the associated module 28. This electrical power is transformed by the electrical machine 26' and the associated module 28' into mechanical power applied to the accessory box 17 to which the generator 15 is connected.

Of course, these three scenarios have been presented to facilitate the understanding of the invention. The power distribution coefficient Sp can take intermediate values between those represented on the diagram.

In order to carry out torque control C_cons of the electrical machine 28', a module 33 for calculating the power to be injected in order to power the electrical loads receives as input a value of power distribution coefficient Sp, a power value injected into the internal electrical network 22 of the turbo-engine 1, and a power value P_hp of the high-pressure shaft 11. Once the torque control C_cons has been determined from these values, the electrical power module 28' will be able to control the electrical rotating machine 26' in a MLI mode (Pulse Width Modulation) or in a full wave mode. The chosen control mode of the electrical machines 26, 26' depends on the application.

In the event of a malfunction of the hybridization system, an open loop control is preferably activated which uses an imposed drawing from the low-pressure shaft 12 or an imposed drawing from the high-pressure shaft 11.

In the case where electrical rotating machines 26, 26' are used only to draw power from the low-pressure shaft 12 in order to inject power into the electrical network of the aircraft 16, it is possible to simplify the configuration of the hybrid architecture. Indeed, in this case, the electrical machine 26 could take the form of a generator while the associated electrical power module 28 could only have a voltage rectifier bridge function that is more economical than an electrical power module also having also an inverted function.

In the embodiment in FIG. 5, the system 25 comprises two reversible electrical rotating machines 26' mechanically connected to the high-pressure shaft 11 via the accessory box 17. Each electrical rotating machine 26' is associated with an electrical power module 28' connected to the internal electrical network 22 of the turbo-engine 1. Alternatively, the system 25 comprises two electrical rotating machines 26 mechanically connected to the low-pressure shaft 12.

In the embodiment in FIG. 6, the system 25 comprises two generators 15 mechanically connected to the accessory box 17 and intended to power the electrical network of the aircraft 16.

In the embodiment in FIG. 7, the system 25 comprises two electrical channels 34.1, 34.2 each formed by two electrical rotating machines 26, 26' and two electrical power modules 28, 28' electrically connected to the internal electrical network 22 of the turbo-engine 1. In addition, two generators 15 intended to power the on-board network are mechanically connected to the accessories box 17.

In the embodiment in FIG. 8, the system 25 comprises at least one electrical energy storage subassembly 35, such as a battery or supercapacitors, electrically connected to the internal electrical network 22 of the turbo-engine 1.

In the embodiment in FIG. 9, the system 25 includes a generator 15' mechanically connected to the coupling device 27 of the shaft low-pressure 12. The generator 15' is associated with a measuring sensor 32' mounted on the low-pressure shaft 12 in order to determine in particular the rotation speed thereof. The generator 15' is intended to electrically supply the electrical network 16 of the aircraft.

Of course, the different characteristics, variants and/or forms of embodiment of the present invention can be associated with each other in various combinations to the extent that they are not incompatible with one another or exclusive from one another.

Furthermore, the invention is not limited to the embodiments described above and provided solely by way of example. It encompasses various modifications, alternative forms and other variants that those skilled in the art may consider in the context of the present invention and in particular all combinations of the different modes of operation described above, which can be taken separately or in combination.

The invention claimed is:

1. An electrical energy conversion and transport system in an aircraft powered by a turbo-engine from which power can be drawn or injected via a high-pressure shaft and/or a low-pressure shaft, wherein the system comprises:
    at least one first electrical rotating machine mechanically connected to the low-pressure shaft via a coupling device,
    a first electrical power module associated with said first electrical machine,
    a second electrical rotating machine mechanically connected to the high-pressure shaft via an accessory box, and a second electrical power module associated with said second electrical rotating machine,
    said first electrical power module and said second electrical power module being electrically connected to an internal electrical network of the turbo-engine,
    a generator coupled with the accessory box and intended to electrically supply an electrical network of the aircraft, said electrical network of the aircraft being electrically isolated from the internal electrical network of the turbo-engine, and
    a control device able to control an assistance for starting the turbo-engine by at least one electrical rotating machine, to compensate for power drawings by the generator, and to carry out a distribution between a power drawn from the high-pressure shaft and a power drawn from the low-pressure shaft as a function of the operating phases of the turbo-engine.

2. The system according to claim 1, wherein the control device is configured to modify a power distribution coefficient Sp as a function of operating phases of the turbo-engine, said power distribution coefficient Sp being defined as follows:

$$Sp = P\_hp/(P\_hp + P\_bp)$$

P_hp being a portion of the power of the high-pressure shaft passing through the accessory box,
P_bp being a portion of the power of the low-pressure shaft passing through the first electrical rotating machine.

3. The system according to claim 2, wherein the portion of the power of the high-pressure shaft passing through the accessory housing is determined from a speed measurement rotation carried out by a speed sensor mounted on the high-pressure shaft and a torque value of the high-pressure shaft obtained by means of a torque estimator.

4. The system according to claim 2, wherein the portion of the power of the low-pressure shaft passing through the first electrical rotating machine is determined from a current and a voltage of the internal electrical network of the turbo-engine.

5. The system according to claim 1, further comprising two electrical rotating machines mechanically connected to the high-pressure shaft via the accessory box.

6. The system according to claim 1, further comprising two electrical rotating machines mechanically connected to the low-pressure shaft.

7. The system according to claim 1, further comprising two generators mechanically connected to the accessory box.

8. The system according to claim 1, further comprising two electrical channels each formed by two electrical rotating machines and two electrical power modules electrically connected to the internal electrical network of the turbo-engine.

9. The system according to claim 1, further comprising at least one electrical energy storage subassembly electrically connected to the internal electrical network of the turbo-engine.

10. The system according to claim 1, further comprising a generator mechanically connected to the coupling device of the low-pressure shaft, said generator being intended to electrically power the electrical network of the aircraft.

11. The system according to claim 1, wherein the generator and the second electrical rotating machine are mounted on the accessory box head to tail relative to each other.

12. An aircraft comprising an electrical energy conversion and transport system as defined according to claim 1.

* * * * *